Dec. 14, 1965 R. B. HOFSTAD ETAL 3,223,929

BINARY FREQUENCY MODULATION DEMODULATOR

Filed Oct. 3, 1963 2 Sheets-Sheet 1

ROLF B. HOFSTAD & MIROSLAV SWYRYD
INVENTORS

BY Robert G. Clay

ATTORNEY

BINARY FREQUENCY MODULATION DEMODULATOR

Filed Oct. 3, 1963 2 Sheets-Sheet 2

ROLF B. HOFSTAD &
MIROSLAV SWYRYD
INVENTORS

BY Robert G. Clay

ATTORNEY

United States Patent Office 3,223,929
Patented Dec. 14, 1965

3,223,929
BINARY FREQUENCY MODULATION DEMODULATOR

Rolf B. Hofstad and Miroslav Swyryd, Palo Alto, Calif., assignors to Ampex Corporation, Redwood City, Calif., a corporation of California Filed Oct. 3, 1963, Ser. No. 313,482
8 Claims. (Cl. 328—32)

Figure 1:
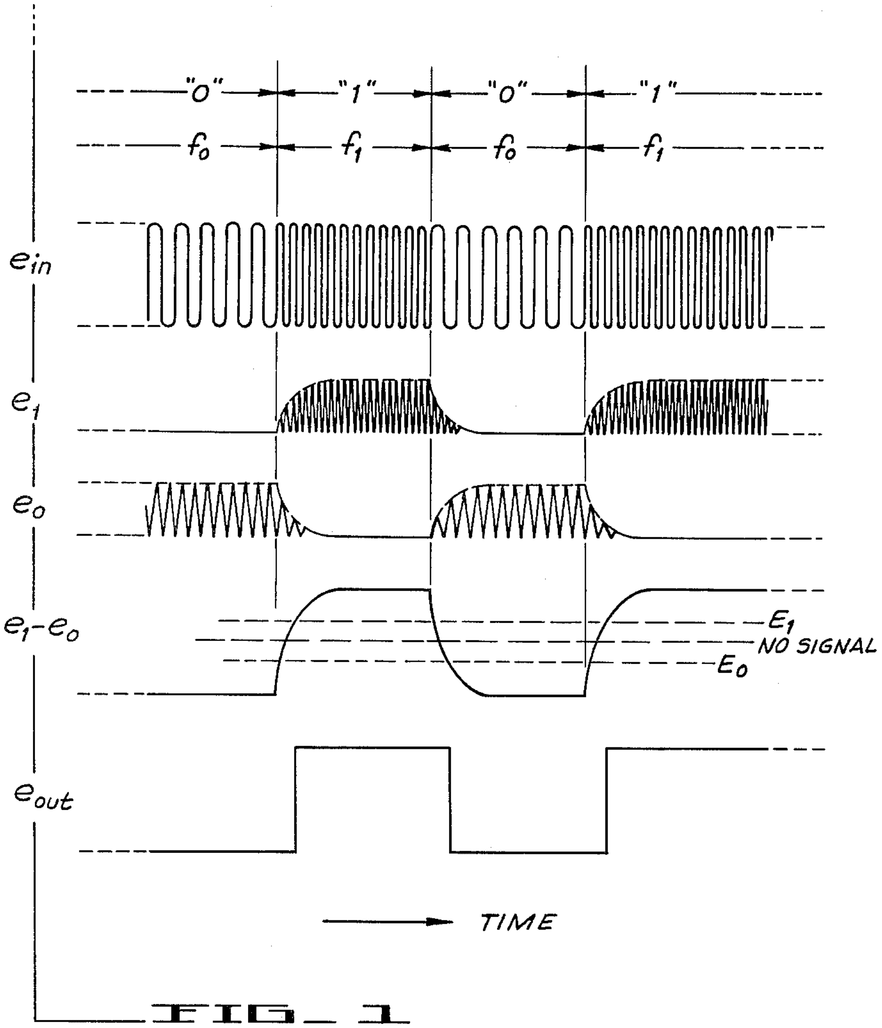

This invention relates to circuit means for demodulating a binary frequency modulated signal.

The need for providing digital communication systems has arisen in recent years as a result of the increasing usage of digital data processing apparatus. Some such systems which have been developed employ frequency modulation techniques for transmitting the digital data, using a first frequency signal to represent a "0" binary digit (bit) and a second frequency signal to represent a "1" bit.

Two general approaches are known in the prior art for demodulating a binary frequency modulated signal. Briefly, the initial approach consists of measuring and identifying the time duration of each individual cycle of the intelligence representing frequency modulated signal. An advantageous characteristic of this approach is that high bitrates can be tolerated for a given bandwidth because as few as one cycle of intelligence frequency can be transmitted per bit. The apparent disadvantage of this approach is that it requires circuitry which is relatively complex and expensive.

The second general approach consists of working in the frequency domain where a discriminator, or two channel filter is able to separate the two intelligence frequencies. The advantage of this method is that the simple tuned transformers or filters required are relatively inexpensive. However, the significant disadvantage is that the transmission bit rate is limited because several cycles of intelligence frequency must be transmitted per bit to allow for the finite rise and fall times of the tuned circuits.

In view of the above, it is an object of the present invention to provide an apparatus for demodulating binary frequency modulated signals which is relatively inexpensive and yet is operable where a relatively high rate of bit transmission is desired.

It is a more particular object of this invention to provide an apparatus which utilizes filtering means to separate binary intelligence frequencies, yet requiring a minimum number of complete cycles thereof.

Briefly, the invention herein is directed to an improved apparatus for demodulating a binary frequency modulated signal, such apparatus utilizing first and second tuned filters, each respectively tuned to a different one of the binary frequencies. The amplitude envelope of each bit is developed by rectification and integration means for application to a differential amplifier which functions to sharply define transitions from a "0" bit to a "1" bit and vice versa, by providing and amplifying a signal representing the difference between the amplitude envelopes. The output of the differential amplifier is suitable for triggering a conventional set-reset flip-flop. In order to increase demodulation resolution so as to permit the data bit transmission rate to be increased, maximum sampling rate means can be advantageously employed between the filters and integrating means.

Figure 2:
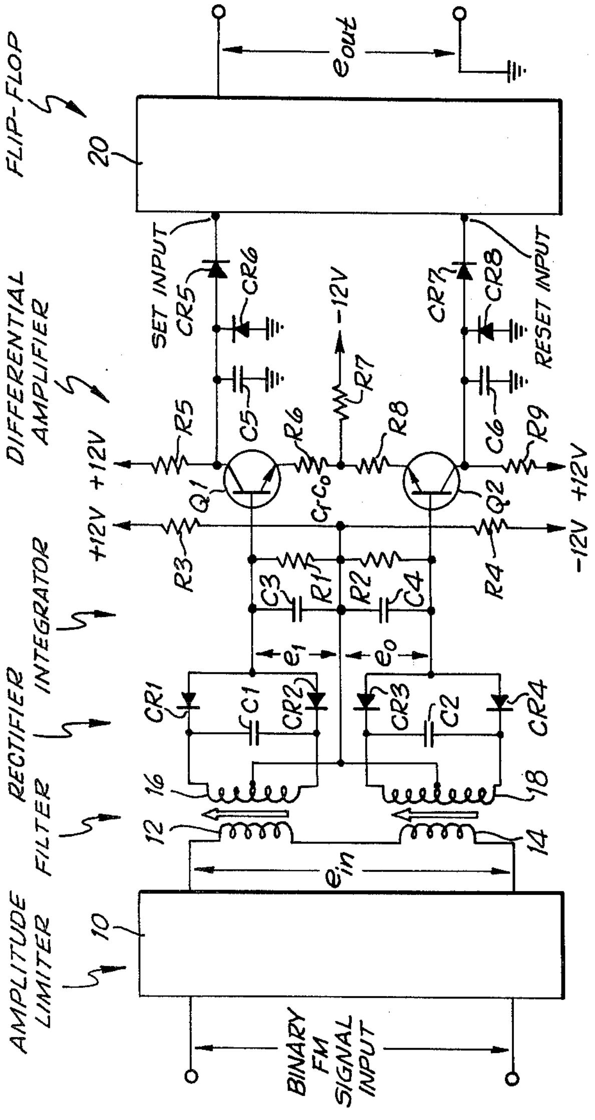

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a waveform chart illustrating a binary frequency modulated waveform, a demodulated binary voltage level waveform, and intermediate waveforms developed by the apparatus of FIGURE 2 during the process of demodulation; and FIGURE 2 is a circuit diagram illustrating a preferred embodiment of the invention.

Attention is now called to FIGURE 1 of the drawings which illustrates a typical binary frequency modulated signal $e_{in}$ which for the interval illustrated represents successive bits of "0," "1," "0," and "1." Note that a binary "0" is represented by the signal $e_{in}$ having a frequency $f_0$ for a discrete bit interval and a binary "1" is represented by the signal $e_{in}$ having a frequency $f_1$ for a discrete bit interval. The purpose of the invention herein is to convert the signal $e_{in}$ to a bilevel voltage signal, as exemplified by the waveform $e_{out}$, suitable for use by conventional digital data processing apparatus.

FIGURE 2 illustrates a preferred embodiment of apparatus in accordance with the invention for converting the waveform $e_{in}$ to the waveform $e_{out}$. The illustrated waveform $e_{in}$ is derived from the output of a conventional amplitude limiter circuit 10 which operates upon a received binary frequency modulated signal (not shown) to provide the signal $e_{in}$ which has the same frequency characteristic as the transmitted signal but whose peaks are of a constant amplitude. The output of the amplitude limiter circuit 10 is applied to a pair of series connected transformer primary windings 12 and 14. The primary windings 12 and 14 are respectively coupled to a pair of secondary windings 16 and 18. Each of the windings 16 and 18 is centered tapped and connected to the junction between resistors R3 and R4, forming a voltage divider network between a source of positive potential, nominally shown as +12 volts, and a source of negative potential, nominally shown as −12 volts. The junction between resistors R3 and R4 thereby establishes a source of reference potential.

The upper and lower terminals of the secondary winding 16 are respectively connected to the cathodes of diodes CR1 and CR2. Connected in parallel with secondary winding 16 is a capacitor C1. Similarly, the upper and lower terminals of the secondary winding 18 are respectively connected to the cathodes of diodes CR3 and CR4 and the capacitor C2 is connected in parallel with the secondary winding 18.

The secondary winding 16 and capacitor C1 form a resonant circuit and their values are chosen so that the resonant frequency of the circuit is equal to $f_1$ thereby causing the circuit to pass a signal having a frequency $f_1$ to reject all other frequencies. Similarly, secondary winding 18 and capacitor C2 have values chosen to pass a signal having a frequency $f_0$ and reject all other frequencies. Precise turning of the respective resonant circuits to the frequencies $f_1$ and $f_0$ can be accomplished by varying either the inductance of the secondary windings 16, 18 or the capacitance of the shunt capacitors C1, C2.

Diodes CR1 and CR2 together form a full wave rectifying circuit which functions to full wave rectify the output of the resonant filter circuit formed by winding 16 and capacitor C1. This full wave rectified output $e_1$ is developed between the anodes of diodes CR1 and CR2 and the junction between resistors R3 and R4. Similarly, a signal $e_0$ representing the full wave rectified output of the filter circuit comprised of winding 18 and capacitor C2 is developed between the anodes of diodes CR3 and CR4 and the junction between resistors R3 and R4. FIGURE 1 illustrates the instantaneous values of signals $e_0$ and $e_1$, as represented by the solid lines showing a train of pulses, which would exist if capacitors C3 and C4 were absent. The full wave rectified pulses are illustrated to point out the frequency doubling effect of full wave rectification which results in effectively doubling the sampling rate of the incoming signal. This increased sampling rate significantly improves the demodulating resolution thereby permitting demodulation when as few as two or three cycles of intelligence frequency are contained in a bit of information.

The provision of the capacitor C3 connected between the anodes of diodes CR1 and CR2 and the junction between resistors R3 and R4, and the provision of capacitor C4 similarly connected to the anodes of diodes CR3 and CR4, causes the integration of the signals $e_1$ and $e_0$ to thereby form a waveform which closely follows the amplitude envelope of these signals, as illustrated by the dashed line representations of waveforms $e_1$ and $e_0$ in FIGURE 1.

Attention is called to the finite rise and decay time of the amplitude envelopes of signals $e_0$ and $e_1$. The simultaneous rise of one envelope and fall of the second envelope results in both filter circuits producing an output voltage during the transition period between binary states. The simultaneous presence of signals $e_0$ and $e_1$ obscures the exclusive presence of either binary "0" or binary "1" as is actually conveyed by the exclusive presence of either $f_0$ or $f_1$ in the waveform $e_{in}$. The effect of the simultaneous presence of signals $e_0$ and $e_1$ is to cause jitter or loss of pulse resolution during the transition period. This loss of pulse resolution becomes especially serious with increasing bit rates where the bit period is comparable to or shorter than the rise and decay times of the amplitude envelopes.

In order to eliminate the effects of the apparent simultaneous presence of "0" and "1," the filter outputs $e_0$ and $e_1$ are combined by a differential amplifier circuit including NPN transistors Q1 and Q2.

The differential amplifier circuit includes resistors R5 and R9 which respectively couple the collectors of transistors Q1 and Q2 to a source of positive potential, nominally shown as +12 volts. Resistors R1 and R2 respectively connect the bases of transistors Q1 and Q2 to the source of reference potential at the junction between resistors R3 and R4 and thereby provide a base current path. The emitters of transistors Q1 and Q2 are respectively connected through resistors R6 and R8 to resistor R7 and thence to a source of negative potential, nominally shown as −12 volts. The anodes of diodes CR1 and CR2 are connected directly to the base of transistor Q1 and the anodes of diodes CR3 and CR4 are connected directly to the base of transistor Q2. The outputs of the differential amplifier are taken, as is usual, from the collectors of the transistors Q1 and Q2 and respectively connected through diodes CR5 and CR7 to the set and reset input terminals of a conventional set-reset flip-flop 20.

As is well known in the art, the differential amplifier circuit functions to produce the output waveform $e_1-e_0$ illustrated in FIGURE 1, which represents the instantaneous difference between the signals $e_1$ and $e_0$. Moreover, the differential amplifier functions to amplify the combined signal $e_1-e_0$ which is utilized to trigger the flip-flop 20. The flip-flop 20 has a built-in threshold level such that if a proper polarity voltage level equal to or greater than $E_1$ is applied to the input of the differential amplifier, the flip-flop will now switch to its set state, and similarly if an opposite polarity voltage level equal to or greater than $E_0$ is applied to the input of the differential amplifier, the flip-flop will switch to its reset state.

With no input signal applied to the amplitude limiter 10, diodes CR5 and CR7 are non-conducting and the flip-flop 20 cannot be switched. With an input signal applied to the amplitude limiter circuit 10, either diode CR5 or CR7, but never both simultaneously, will conduct depending upon the polarity and amplitude of the signal $e_1-e_0$ applied between the bases of transistors Q1 and Q2. When $e_1-e_0$ exceeds the threshold level $E_1$, collector current in the transistor Q1 is reduced thereby raising its potential and causing diode CR5 to conduct and the flip-flop 20 to be triggered to a set state. On the other hand, when signal $e_1-e_0$ exceeds the threshold level $E_0$, collector current in transistor Q2 will be reduced to thereby raise its potential and cause diode CR7 to conduct and in turn cause the flip-flop 20 to be triggered to its reset state. In the set state, the flip-flop output $e_{out}$ will be at one voltage level, and in the reset state, it will be a second voltage level as represented by the waveform $e_{out}$ in FIGURE 1.

It has already been pointed out that resistors R1 and R2 provide base current paths for transistors Q1 and Q2 respectively. Emitter resistors R6 and R8 determine the gain and stability of the transistors Q1 and Q2 and resistor R7 establishes the common emitter current source for differential amplification by Q1 and Q2. Resistors R5 and R9 appropriately load the transistor collectors. Diodes CR6 and CR8 limit the negative voltage swing of the transistor collectors and capacitors C5 and C6 provide a small amount of triggering current integration.

From the foregoing, it should be appreciated that a relatively simple and inexpensive binary frequency modulation signal demodulator has been provided which employs a pair of simple tuned filters, as is common in the prior art, but which in addition incorporates circuit means for increasing the demodulator resolution so as to require fewer cycles of intelligence frequency per data bit transmitted. Increased resolution is effected by maximizing the sampling rate input signal, as can be inexpensively accomplished by providing the full wave rectifier circuit illustrated, and sharp delineation between transitions from a "0" bit to a "1" bit can be detected by the use of a differential amplifier which develops and amplifies the difference between signals representing the two frequency components.

What is claimed is:

1. Apparatus for demodulating a signal which during certain discrete intervals has a first frequency and during other discrete intervals has a second frequency, said apparatus comprising a first filter tuned to said first frequency and having an input and an output terminal; a second filter tuned to said second frequency and having an input and an output terminal; means for applying said signal to said first and second filter input terminals; first signal rectification and integration means having an input and an output terminal, the input terminal thereof being connected to said first filter output terminal; second rectification and integration means having an input and an output terminal, the input terminal thereof being connected to said second filter output terminal; and a differential amplifier having first and second input and output terminals, the first and second input terminals thereof being respectively connected to the output terminals of said first and second rectification and integration means, wherein the differential amplifier provides amplified signals via the output terminals thereof in response to the difference between the signals introduced to the input terminals thereof.

2. The apparatus of claim 1 wherein said first and second rectification and integration means each includes a full wave rectifying circuit.

3. The apparatus of claim 1 wherein said means for applying said signal to said first and second filter input terminals includes an amplitude limiter circuit.

4. The apparatus of claim 3 further including flip-flop means having a first and a second input terminals wherein the amplified signals appearing via the first and second differential amplifier output terminals are selectively introduced to said first and second flip-flop means input terminals to selectively energize the flip-flop means.

5. The apparatus of claim 4 wherein a transformer primary winding is connected to said amplitude limiter circuit; each of said first and second filters respectively including first and second transformer secondary windings coupled to said transformer primary winding; and tuning means including a capacitor connected to each of said transformer secondary windings.

6. Apparatus for demodulating a signal which during certain discrete intervals has a first frequency and during other discrete intervals has a second frequency, said apparatus comprising a first filter tuned to said first frequency and having an input and an output terminal; a second filter tuned to said second frequency and having an input and an output terminal; means for applying said signal to said first and second filter input terminals; first signal integrating means having an output terminal; second signal integrating means having an output terminal; means for respectively connecting the output terminals of said first and second filters to said first and second integrating means; a differential amplifier having first and second input terminals; means connecting the output terminal of said first integrating means to said first differential amplifier input terminal and the output terminal of said second integrating means to said second differential amplifier input terminal; said differential amplifier having first and second output terminals; a flip-flop having first and second input terminals; and means respectively connecting said first and second differential amplifier output terminals to said first and second flip-flop input terminals.

7. Apparatus for converting a binary frequency signal formed of a first and second frequency to a binary voltage level signal comprising an amplitude limiter circuit; means for applying said binary frequency signal to said amplitude limiter circuit; a first filter tuned to the first frequency of said binary frequency signal; a second filter tuned to the second frequency of said binary frequency signal; first and second rectification means respectively connected to said first and second filters; first and second integrating means respectively connected to said first and second rectification means; a differential amplifier; means for respectively connecting said first and second integrating means to said differential amplifier; flip-flop means capable of providing a binary voltage level output signal; and means coupling said differential amplifier to said flip-flop means for causing said flip-flop means to provide a first voltage level output signal in response to said first frequency of said binary frequency signal and a second voltage level output signal in response to said second frequency of said binary frequency signal.

8. The apparatus of claim 6 wherein said means for respectively connecting said first and second differential amplifier output terminals to said first and second flip-flop input terminals comprises first and second unidirectional current conducting elements.

No references cited.

ARTHUR GAUSS, *Primary Examiner.*

S. D. MILLER, *Assistant Examiner.*